Figure 1:
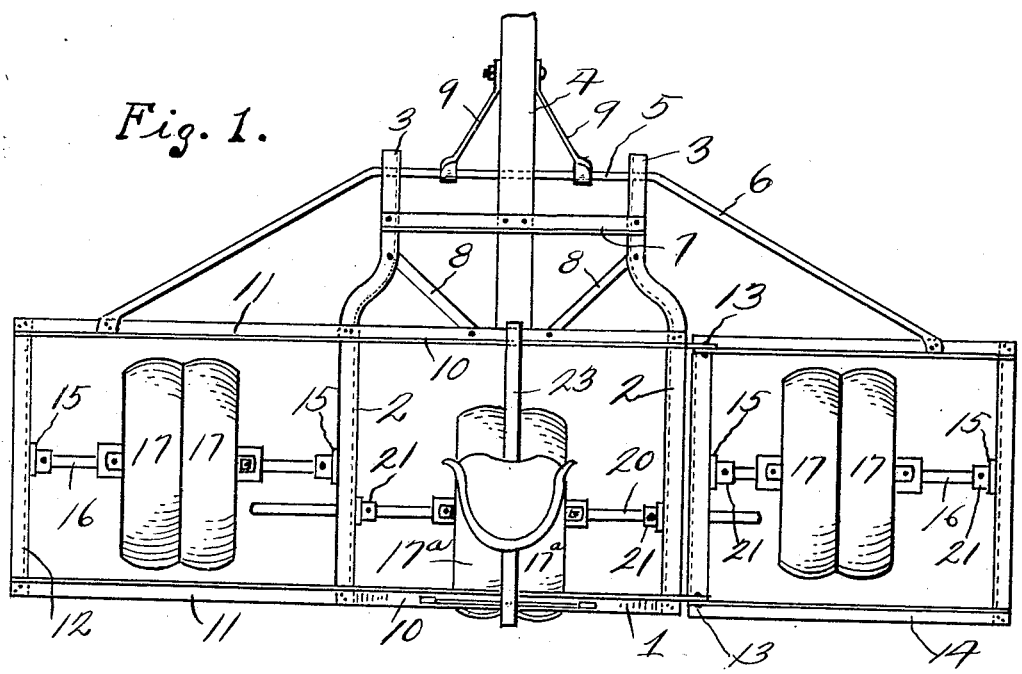

Feb. 2, 1932. H. O. COOPER 1,843,110
FURROW PACKING MACHINE
Filed Aug. 30, 1929

INVENTOR
Harry O. Cooper
BY
Philip A. H. Serrill
his ATTORNEY

Patented Feb. 2, 1932

1,843,110

UNITED STATES PATENT OFFICE

HARRY O. COOPER, OF HERMAN, NEBRASKA

FURROW PACKING MACHINE

Application filed August 30, 1929. Serial No. 389,443.

The invention relates to furrow packing machines and has for its object to provide a device of this character having pairs of rollers adapted to roll over furrows for packing the ground around hills after a planting operation, thereby retaining the moisture in the ground around the hills for a considerable time.

A further object is to provide a furrow packing machine comprising a frame having a central portion, an extension carried by said central portion and provided with a pair of pressing rollers and a pivoted extension carried by the opposite side of the frame and provided with a pair of rollers, said pivoted section forming means whereby the rollers carried thereby will move upwardly and downwardly to conform to the contour of the ground without raising the other pairs of rollers out of engagement with the furrows.

A further object is to provide the frame with a forwardly extending tongue, whereby the device may be attached to draft means for following a planting machine or for attachment to draft animals.

A further object is to provide the hinged extension and the rigid extension of the frame with axially alined shafts on which are transversely adjustably mounted pairs of rollers and a transverse shaft carried by the frame out of alinement with the first mentioned shaft and having rollers transversely adjustable thereon and centrally disposed in relation to the machine.

A further object is to provide a flexible brace arm connected to the hinged frame section and extending inwardly and forwardly and anchored to a forwardly extending arm of the frame and forming means for bracing the hinged frame section during its hinged movement.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 2:
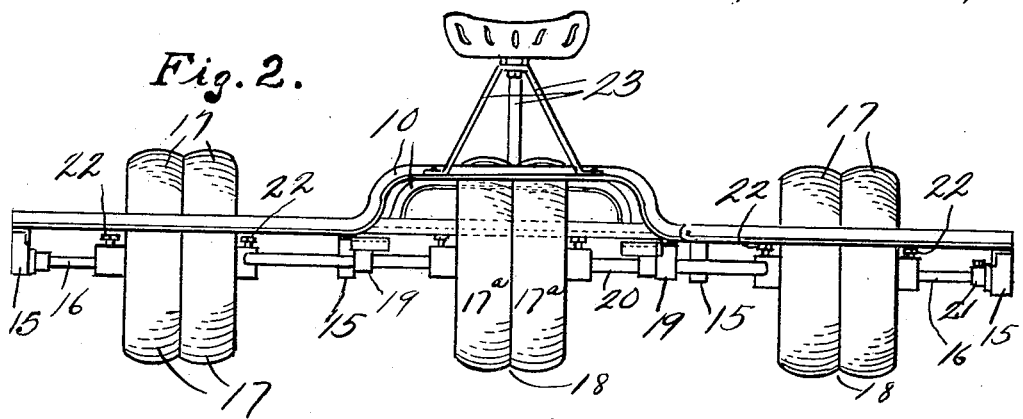
Figures 3, 4:
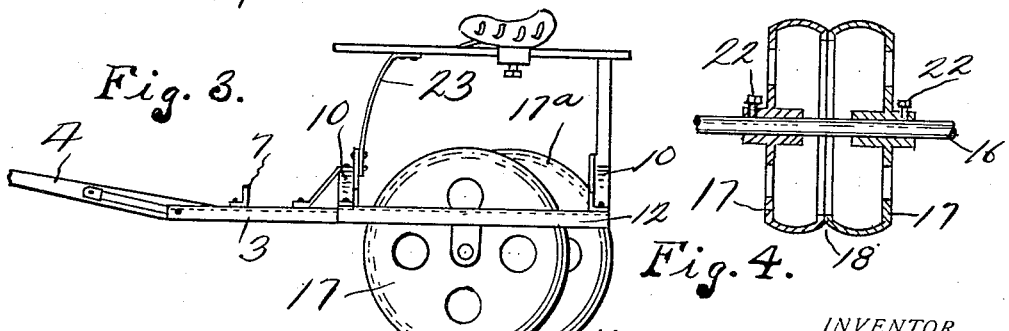

In the drawings:
Figure 1 is a top plan view of the machine.
Figure 2 is a rear elevation.
Figure 3 is a side elevation.
Figure 4 is a vertical transverse sectional view through a pair of the rollers.

Referring to the drawings, the numeral 1 designates a rectangular shaped frame of the device, the side bars 2 of which extend forwardly to form the spaced arms 3 between which the tongue 4 extends. The tongue 4 is connected to the frame by means of the transverse portion 5 of the flexible brace 6, and by the transverse brace bar 7, clearly shown in Figure 1. Brace bar 7 also braces the arms 3, said arms 3 being additionally braced by the angular bars 8. The tongue 4 is provided with outwardly and rearwardly extending arms 9, which are connected to the transverse portion 5 of the flexible brace 6. Therefore it will be seen that the tongue is rigidly braced in relation to the frame 1 at all times. The transverse bars 10 of the frame 1 are arched and have one of their ends provided with integral extensions 11 which extensions are connected together by the end bar 12, thereby forming an extension to the frame 1.

Hingedly connected at 13 to one of the ends of the transverse bars 10 is a rectangular shaped extension frame 14, which frame, as well as the extension at the other side of the frame 1, is provided with downwardly extending bearing blocks 15 in which are rotatably mounted transverse shafts 16 on which are transversely adjustable pairs of rollers 17. The flexible brace 6 allows hinged movement of the extension frame 14, as said frame moves upwardly or downwardly according to the contour of the ground. Therefore it will be seen that the pairs of rollers may be transversely adjusted accordingly to the distance between the furrows. The rollers 17 are preferably formed from casting and have their outer peripheries transversely curved whereby a V-shaped channel 18 is formed, Figure 4, so that the earth will be packed and hilled during the rolling and packing operation.

The main frame section 1 is provided with downwardly extending bearings 19, in which is mounted rotatably a transverse shaft 20, rearwardly offset in relation to the shafts 16, and on which is adjustably mounted rollers 17a similar to the rollers 17, whereby it will be seen that as the machine moves forwardly, the three pairs of rollers will roll three furrows at the same time, and as the rollers 17 and 17a, carried by the frame 1 and its rigid extension, would form a two point support, it is obvious that adjacent rows would be uniformly rolled with uniform pressure, while the rollers 17 carried by the hinged section 14 would roll a third row or furrow without interferring with the rolling operation of the other two pairs of rollers, and during this rolling operation the brace 6 being flexible would allow freedom of movement of the frame extension 14. The transverse shafts 16 are preferably provided with adjustable collars 21 for cooperation with adjacent bearings for holding the shaft in various adjusted positions and the adjustment of the rollers may be accomplished by adjusting the collars 21 or by adjusting the rollers by loosening the set screws 22 if desired, and according to conditions. Extending upwardly from the frame 1 is a seat supporting frame 23 on which the operator is seated for controlling the device, particularly when used in connection with draft animals.

From the above it will be seen that a furrow roller is provided, which is simple in construction, the parts reduced to a minimum and one wherein three sets of rollers are used, two of said sets being in fixed relation to each other and the other set in upward and downward movable relation to the other rollers, thereby allowing the rolling of three furrows at the same time.

The invention having been set forth what is claimed as new and useful is:—

A furrow rolling machine comprising a frame, forwardly extending arms carried by said frame, a draft pole carried by the frame between the arms, a rigid extension frame carried by one side of the frame, a pair of furrow rollers carried by the rigid extension frame, a pair of furrow rollers carried by the frame in line of draft, a hinged extension frame carried by the other side of the frame, a pair of furrow rollers carried by the hinged extension frame, and a flexible member connected to the hinged extension frame adjacent its outer end and inclining inwardly and forwardly and anchored to one of the forwardly extending arms.

In testimony whereof I hereunto affix my signature.

HARRY O. COOPER.